March 11, 1969  H. RIETHMULLER ET AL  3,431,786
SYMMETRICAL GYROSCOPE
Filed Oct. 5, 1966
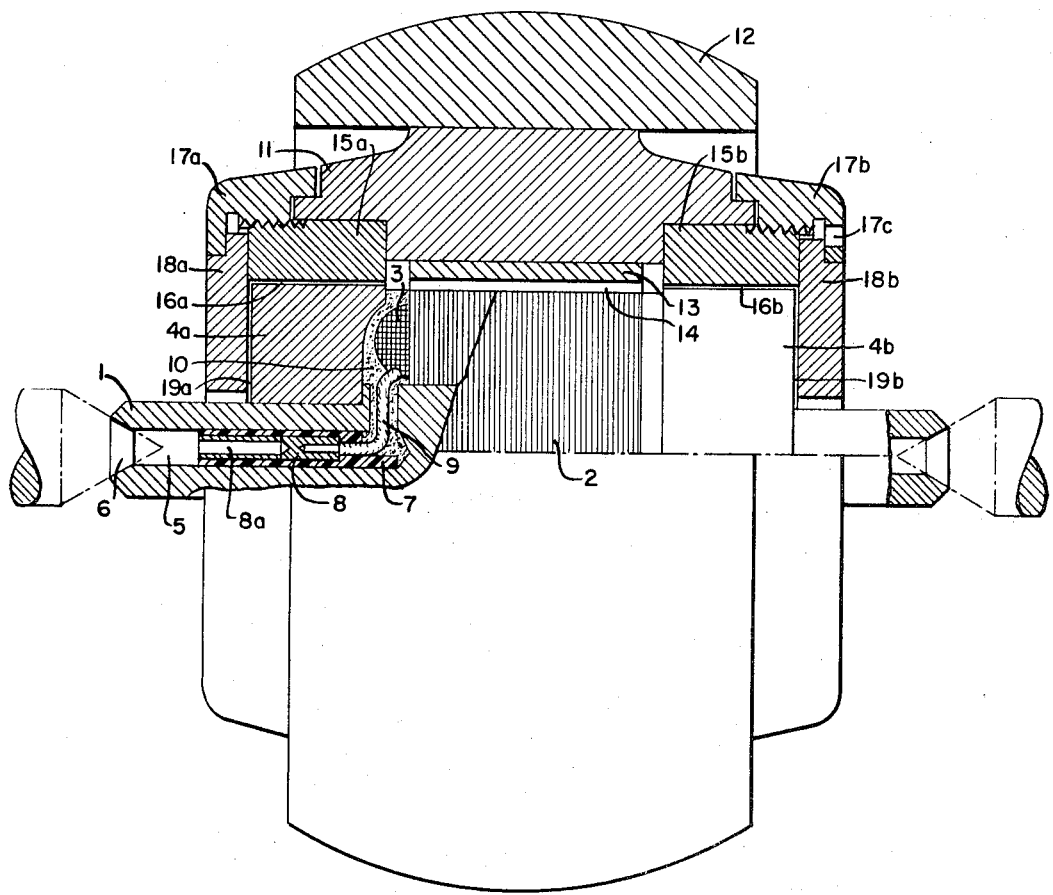
FIG. I.
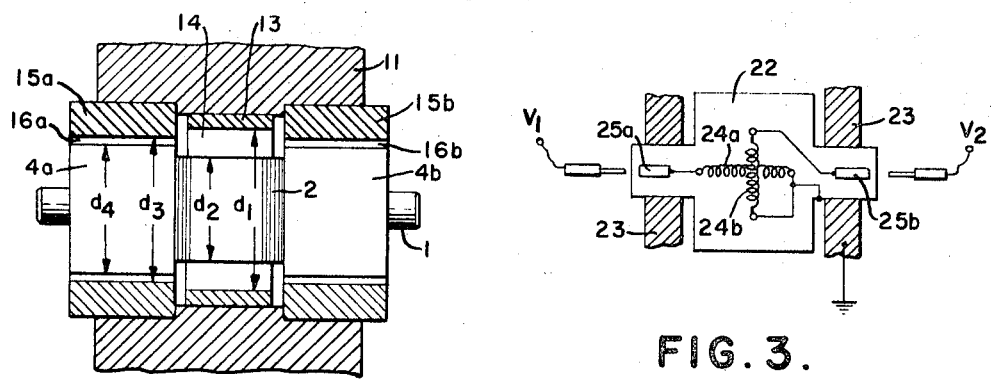
FIG. 2.
FIG. 3.
INVENTORS
Heinz Riethmüller &
Dieter Thomaier
BY *Spencer & Kaye*
ATTORNEYS United States Patent Office 3,431,786
Patented Mar. 11, 1969

3,431,786
SYMMETRICAL GYROSCOPE
Heinz Riethmuller, Heidelberg-Kirchheim, and Dieter Thomaier, Heidelberg, Germany, assignors to Teldix Luftfahrt-Ausrustungs G.m.b.H., Heidelberg-Wieblingen, Germany
Filed Oct. 5, 1966, Ser. No. 584,389
Claims priority, application Germany, Oct. 7, 1965,
T 29,538
U.S. Cl. 74—5
Int. Cl. G01c 19/02
7 Claims

ABSTRACT OF THE DISCLOSURE

A gyro with an inner stator and an outer rotor. The stator has a driving component and two bearings located axially on opposite sides thereof, the outside diameter of the two bearings being equal to each other and at least as great as the outside diameter of the driving component. The rotor has a driving component and two bearing sleeves located axially on opposite sides thereof, the inside diameter of the two sleeves being equal to each other and no greater than the inside diameter of the driving component. The two driving components are axially aligned and each stator bearing is axially aligned with a respective rotor sleeve so that two gas cushion type bearings are formed. In this way, the inside and outside diameters of the annular cylindrical gaps between the two cushions are limited by the inside and outside diameters of the annular cylindrical gap between the two driving components.

---

The present invention relates to a gyro whose rotor is supported by a gas cushion.

There exist gyros whose rotors are supported by so-called dynamic gas cushions, that is to say, gas cushions which are formed as the result of the rotation of the rotor without it being necessary to supply the gaseous medium under pressure. These gas cushions are generally made up of bearing cylinders and bearing discs because they are elements of simple geometrical configuration and can therefore more easily be machined with the requisite high degree of accuracy than is the case with calotte-shaped or conical bearing elements.

One type of conventional gyro has only one inner and one outer bearing cylinder which form a cylindrical gap between themselves. These gyros, however, are either unsymmetrical with respect to the median cross-sectional plane—this being due to the fact that a gyro of this type has to make do with a bell-shaped rotor—and are therefore unsatisfactory and complicated (see "Aerodynamic Gas Spin Axis Bearings for Gyros," R. W. Forse and A. G. Patterson, Symposium on Gyros, London, Feb. 25 and 26, 1965, published by The Institution of Mechanical Engineers, 1 Birdcage Walk, Westminster, London, S.W. 1, England, page 74, Figure 7.7.b), or the gyro has an outer stator which has the undesired result of reducing the torque-to-weight ratio (op. cit., Figure 7.7.a and Figure 7.1.a on page 65).

Another type of conventional gyro is built symmetrically and has an inner stator but requires two individual radial bearings which have to be machined separately, and this makes it enormously difficult to align the two bearings when the gyro is assembled (see "New Frontiers in Gas Bearings," B. Sternlicht, Automotive Engineering Congress, Detroit, Mich., Jan. 11 to 17, 1964, published by The Society of Automotive Engineers, Inc., 485 Lexington Avenue, New York, N.Y. 10017, Paper No. 810B, page 12, Figure 14, at the bottom).

It is, therefore, the primary object of the present invention to provide a gyro which overcomes the drawbacks of the heretofore known gyros, namely, to provide a symmetrical gyro having an internal stator, the two radial bearings of which gyro can be machined in one operation and therefore more simply than was the case in heretofore known gyros, and which bearings will definitely be in proper alignment with each other.

With the above object in view, the present invention resides, basically, in a gyro comprising an inner stator and an outer rotor, the stator having a driving component and two bearings located axially on opposite sides thereof, the outside diameter of the two bearings being equal to each other and at least as great as the outside diameter of the driving component. The stator also has a driving component and two bearing sleeves located axially on opposite sides thereof. The inside diameters of the two sleeves are equal to each other and no greater than the inside diameter of the driving component of the rotor. The two driving components are axially aligned with each other, and each respective bearing of the stator is axially aligned with a respective one of the sleeves of the rotor thereby to form two respective gas cushion type bearings. As a result, the inside and outside diameters of the annular cylindrical gaps between the two sets of bearings and sleeves are limited by the inside and outside diameters of the annular cylindrical gap between the two driving components.

According to a further feature of the present invention, the stator of a gyro has a shaft carrying an electrical element, e.g., a winding, and two axial bores which open at the opposite ends of the shaft, there being electrical connecting means arranged in the bores. The electrical connecting means are connected to the electrical element and are themselves connectible to further connecting means.

According to still another feature of the present invention, each axial bore in the stator shaft extends throughout an axial distance sufficient to allow the stator to be supported on centers of a machine for working the stator, such as a machine tool or a winding machine.

Additional objects and advantages of the present invention will become apparent upon consideration of the following description when taken in conjunction with the accompanying drawings in which:

FIGURE 1 is an elevational and partly sectional view of a gyro according to the present invention.

FIGURE 2 is a diagrammatic view, showing on an exaggerated scale the relationship of the diameters of various parts of the gyro according to the present invention.

FIGURE 3 is a diagrammatic view showing another feature of a gyro according to the present invention.

Referring now to the drawings and first to FIGURE 1 thereof, the same shows the upper left part of the stator in section and most of the upper right part in elevation. The entire upper half of the rotor is shown in section.

The gyro comprises a stator shaft 1 which, throughout its central region, has an enlarged diameter. The stator body 2 consists of a stack of iron laminations which are pressed on the central part of the shaft 1. The ends of the winding, one of which is shown at 3, project from the two sides of the stack. Two inner bearing journals, constituted by two bearing rings 4a and 4b, are also pressed onto the shaft 1, these bearings 4a, 4b, being on the end parts of the shaft which are of smaller diameter than the central part and to the left and right of the stack 2. The shoulders which are formed between the central and end parts of the shaft 1 serve as abutments against which the bearings 4a, 4b, lie.

FIGURE 1 also shows the left end of the shaft 1 as having an axial bore 5, which flares into a conical opening 6, there being arranged within the bore 5 an insulating sleeve 7 within which there is a socket 8 having a bore 8a adapted to receive a plug, the socket 8 being electrically connected to one end 3 of the stator winding by means of an insulated wire 9 which passes through a radial bore of the shaft 1. The interspace between the stack 2 and the ring 4a, and also the space in the radial and axial bore of the shaft 2 which is not occupied by the insulating sleeve 7 and the wire 9, are filled with a hardenable filler mass, the same completely embedding the end 3 of the stator winding. In practice, it may be desirable to leave a radial gap between the hardenable filler mass and the bearing 4a so as to prevent mechanical stresses to be transmitted to the bearing 4a when the electrical component of the stator expands due to thermal influences.

The right end of the shaft 1 is of similar and symmetrical construction so that the other end of the stator winding is connected to another socket which is contactable via another plug.

The rotor is made up of a central rotor body 11, the same carrying a flywheel 12 which is made of a metal of high specific gravity and which is shrunk onto the rotor body 11. The rotor body 11 also carries a relatively thin hysteresis ring 13 which is arranged interiorly of and axially in the middle of the rotor body 11. The hysteresis ring 13 is made of a magnetically hard material and serves solely as the driving component of the rotor. The magnetic field which drives the rotor extends between the hysteresis ring 13 and the stator body 2—this being the driving component of the stator—the cylindrical gap 14 formed between the parts 2 and 13 being hereinafter referred to as the magnetic field gap. This gap is, in practice, about 80 microns.

Two bearing sleeves 15a and 15b are pressed into the rotor body 11, the sleeves 15a, 15b, being arranged on opposite sides of the hysteresis ring 13 and having inside diameters smaller than (or at least no greater than) the diameter of the hysteresis ring 13. The sleeves 15a, 15b have rectangular cross sections and extend axially beyond the rotor body 11, with so much of the length of the sleeves which extends beyond the body 11 being provided with an external thread. The outwardly directed end faces are machined to be perfectly flat fitting surfaces; similarly, the inner cylindrical surfaces of the sleeves 15a, 15b and the outer cylindrcial surfaces of the bearings 4a, 4b are very precisely machined so that the annular gaps 16a and 16b formed between the parts 15a/4a and 15b/4b will have a width of only about 2 to 3 microns. Two screw caps 17a, 17b are threaded on the sleeves 15a, 15b, respectively, and hold in place two bearing plates 18a, 18b, respectively, so that the same seat on the fitting surfaces of the sleeves 15a, 15b. The screw caps are provided with two holes, one of which is shown in the screw cap 17b at 17c, so as to allow the insertion of a suitable tool for tightening and loosening the caps.

The plates 18a, 18b are in the form of annular discs whose inner diameter is sufficiently large to allow the shaft 1 to pass freely therethrough. Also, the inner faces of the plates 18a, 18b are likewise machined so as to be perfectly flat, as are the outer faces of the bearings 4a, 4b, so that the radial gaps 19a, 19b formed between the faces of the parts 18a/4a and 18b/4b will likewise have a thickness of between about 2 to 3 microns.

For the final machining step, both sleeves 15a, 15b are already in place in the rotor body 11. Similarly, both bearings 4a, 4b are already mounted on the stator shaft 1 prior to be subjected to the final machining step for working the surfaces of the bearings. This is where the conical openings 6 of the bores 5 come in, in that they allow the shaft 1 carrying the bearings 4a and 4b to be placed on centers and the machine tool, e.g. a grinding or polishing tool, so that the actual working element of the machine tool can, in one continuous feed, be passed over the outer radial surfaces of both bearings, thanks to the fact that the outer diameter of the stack 2 is smaller than (or at least no greater than) that of the bearings 4a, 4b. Similarly, the inner surface of both sleeves 15a, 15b of the rotor can be machined in one continuous feed.

After the surfaces have been machined, the gyro is assembled by passing the stator assembly into the rotor assembly. Since, in the course of this, one of the bearings (4a or 4b) has to be passed through the sleeve (18b or 18a) which, in the assembled gyro, will be axially aligned with the other bearing, it is essential that both of the bearings and both of the sleeves have the same dimensions. While in heretofore conventional gyros having separate bearings all that was necessary was that each bearing be matched to its respective sleeve, the requirement that, in a gyro according to the present invention, both bearings and both sleeves have the same dimensions, is readily met, as described above.

It will thus be seen that the bearings of the stator can be machined in one step, as can be the sleeves of the rotor, this being so inasmuch as the inside diameter of hysteresis ring 13 is no smaller than the inside diameter of the sleeves 15a, 15b, and the outside diameter of the stack 2 is no greater than the outside diameter of the bearings 4a, 4b. This relationship is shown, on an exaggerated scale, in FIGURE 2, wherein $d_1$ is the inside diameter of the hysteresis ring 13, $d_2$ the outside diameter of the stack 2, $d_3$ the inside diameter of the sleeves 15a, 15b, and $d_4$ the outside diameter of the bearings 4a, 4b, so that the relationships between the diameters can be expressed as follows:

$$d_1 \geqq d_3$$
$$d_2 \leqq d_4$$

In the illustrated embodiment, $d_1 > d_3$ and $d_2 < d_4$. As a result, there is obtained a gyro having a stator whose two bearings are located axially on opposite sides of the driving component of the stator, i.e., the stack of laminations 2, which two bearings themselves have the same outside diameter, and a rotor whose opening is formed, at its axial ends, by two bearing sleeves having the same inside diameter and, in its central region, by the driving component, i.e., the hysteresis ring 13. The inside and outside diameters of the annular cylindrical gaps between the two sets of bearings and sleeves are therefore limited by the inside and outside diameters of the magnetic field gap between the driving components of the rotor and stator.

It will be seen from the above that, thanks to the present invention, the bearing surfaces of the rotor and stator can be machined in one step, that is to say, the machining, honing, grinding or polishing tool can be moved axially with respect to the stator or rotor being worked and engage the two bearing surfaces of each so that both will have precisely the same dimensions imparted to it. Moreover, inasmuch as the assembly and disassembly of the gyro does not require the two bearings of the stator or the two bearing sleeves of the rotor to be moved or displaced with respect to each other, the stator bearings and rotor sleeves will at all times retain exactly the same precise alignment which was built into the components at the time each was manufactured.

The above also shows that, in accordance with a further feature of the present invention, the stator shaft itself, being provided with axial bores, is utilized to allow the electrical element of the stator, e.g., the winding, to be electrically contacted, such as by removable plugs which cooperate with the sockets 8, 8a.

Yet another feature of the present invention will be seen to reside in the fact that the axial bores for receiving the electrical connections, if made sufficiently deep, allow the stator to be supported on the centers of a machine tool which is to work the various surfaces of the stator. This, it will be appreciated, is in contradistinction to known stators in which the electrical connecting means extend beyond the ends of the stator shaft so that there arose the problem of how to make it possible conveniently to mount the stator on the machine tool in the first place. This problem, it will be seen, is solved by making the axial bores of sufficient axial length so as to allow the tips of the centers to penetrate into the bores. The seating of the centers is materially assisted by providing the bores with the outwardly flaring openings, as shown at 6 in FIGURE 1.

The foregoing feature is not limited in its application to gas cushion type gyros, in that it is suitable for use in other types of gyros having inner stators, particularly miniature gyros in which it was heretofore virtually always customary to let the ends of the electrical connections extend from the ends of the stator shaft. These leads, however, are in the way when the stator is to be wound on automatic winding machines which are usually designed so as to mount the stator on conical centers. The same problem arises when the windings of the gyro stator are to be reinforced with a hardenable molded mass after which the pole surface of the stator has to be cleaned and ground to a precise dimension. Yet another danger resided in the fact that leads at the outer ends of the central bores were subject to bending and other damage, both to the wire and the insulation, whenever the stator was handled prior to and during assembly, and also during transportation of the gyro. All of these dangers, it will be seen, are avoided by locating the electrical connecting means in axial bores opening at the ends of the stator shaft, the inconveniences incident to the handling of the stator during winding and machining operations being additionally avoided by making these bores sufficiently deep to enable them to receive the centers of the machine tool or winding machine on which the stator is to be worked.

Normally, the gyro stator has two serially connected windings so as to provide three electrical connection points, one of them being the junction of the two windings. According to another feature of the present invention, the free ends of the windings are connected, respectively, to the electrical connectors in the ends of the stator shaft, while the third connection is conductively connected with the shaft itself. Such an arrangement is illustrated in FIGURE 3 which shows a stator 22 arranged in a housing 23. The two windings 24a and 24b are energized, via respective plugs and sockets 25a, 25b, by two voltages $V_1$ and $V_2$ which are 90° out of phase with each other. The junction of the two serially connected windings 24a, 24b, is connected to the stator shaft which itself is grounded via the housing 23. In this way, two plug-type connectors—which themselves are arranged centrally in the ends of the shaft—are all that is needed.

It will be understood that the above description of the present invention is susceptible to various modifications, changes, and adaptations, and the same are intended to be comprehended within the meaning and range of equivalents of the appended claims.

What is claimed is:
1. A gyro comprising, in combination:
 (1) an inner stator having a driving component and two bearings located axially on opposite sides thereof, the outside diameter of said two bearings being equal to each other and at least as great as the outside diameter of said driving component; and
 (2) an outer rotor having a driving component and two bearing sleeves located axially on opposite sides thereof, the inside diameter of said two sleeves being equal to each other and no greater than the inside diameter of said last-mentioned driving component, eter of said last-mentioned driving component,
 (3) said driving components of said stator and rotor being axially aligned with each other and each respective bearing of said stator being axially aligned with a respective one of said sleeves of said rotor thereby to form two respective gas cushion type bearings, in consequence of which the inside and outside diameters of the annular cylindrical gaps between the two sets of bearings and sleeves are limited by the inside and outside diameters of the annular cylindrical gap between said two driving components.

2. A gyro as defined in claim 1 wherein the inside diameter of said driving component of said rotor is greater than the inside diameter of said bearing sleeves.

3. A gyro as defined in claim 1 wherein the outside diameter of said driving component of said stator is smaller than the outside diameter of said bearings.

4. A gyro as defined in claim 1 wherein the inside diameter of said driving component of said rotor is greater than the inside diameter of said bearing sleeves and the outside diameter of said driving component of said stator is smaller than the outside diameter of said bearings.

5. A gyro as defined in claim 1 wherein said stator has a shaft carrying said stator driving component and said bearings, said driving component including an electrical element and said shaft having two axial bores which open at the opposite ends of said shaft, there being electrical connecting means in said bores, said connecting means being connected to said electrical element.

6. A gyro as defined in claim 5 wherein said bores extend throughout an axial distance sufficient to allow said stator to be supported on centers of a machine tool for working the surfaces of said stator.

7. A gyro as defined in claim 5 wherein said electrical element of said stator is constituted by winding means having three electrical connection points; two of said points being connected to said electrical connecting means in said two ends of said shaft, respectively, and the third point being conductively connected with said shaft itself.

References Cited

UNITED STATES PATENTS

| 2,438,621 | 3/1948 | Schoeppel | 74—5.7 |
| 2,839,934 | 6/1958 | Shomphe | 74—5.7 |
| 2,986,941 | 6/1961 | Horath | 74—5 |
| 3,203,260 | 8/1965 | Pierry et al. | 74—5.7 |
| 3,225,607 | 12/1965 | Schaberg et al. | 74—5 |
| 3,242,742 | 3/1966 | Parker | 74—5 |
| 3,248,952 | 5/1966 | Beach | 74—5 |

FOREIGN PATENTS 817,570 7/1959 Great Britain.

FRED C. MATTERN, Jr., *Primary Examiner*

MANUEL ANTONAKAS, *Assistant Examiner.*

U.S. Cl. X.R.

74—5.47

UNITED STATES PATENT OFFICE
CERTIFICATE OF CORRECTION

Patent No. 3,431,786                                March 11, 1969

Heinz Riethmuller et al.

It is certified that error appears in the above identified patent and that said Letters Patent are hereby corrected as shown below:

In the heading to the printed specification, line 9, after "T 29,538" insert -- ; Oct. 19, 1965, T 29,604 --. Column 3, line 44, "cylindrcial" should read -- cylindrical --. Column 6 line 2, cancel "eter of said last-mentioned driving component,"

Signed and sealed this 24th day of February 1970.

(SEAL)
Attest:

Edward M. Fletcher, Jr.                        WILLIAM E. SCHUYLER, JR
Attesting Officer                                  Commissioner of Patents